United States Patent Office 3,167,989
Patented Feb. 2, 1965

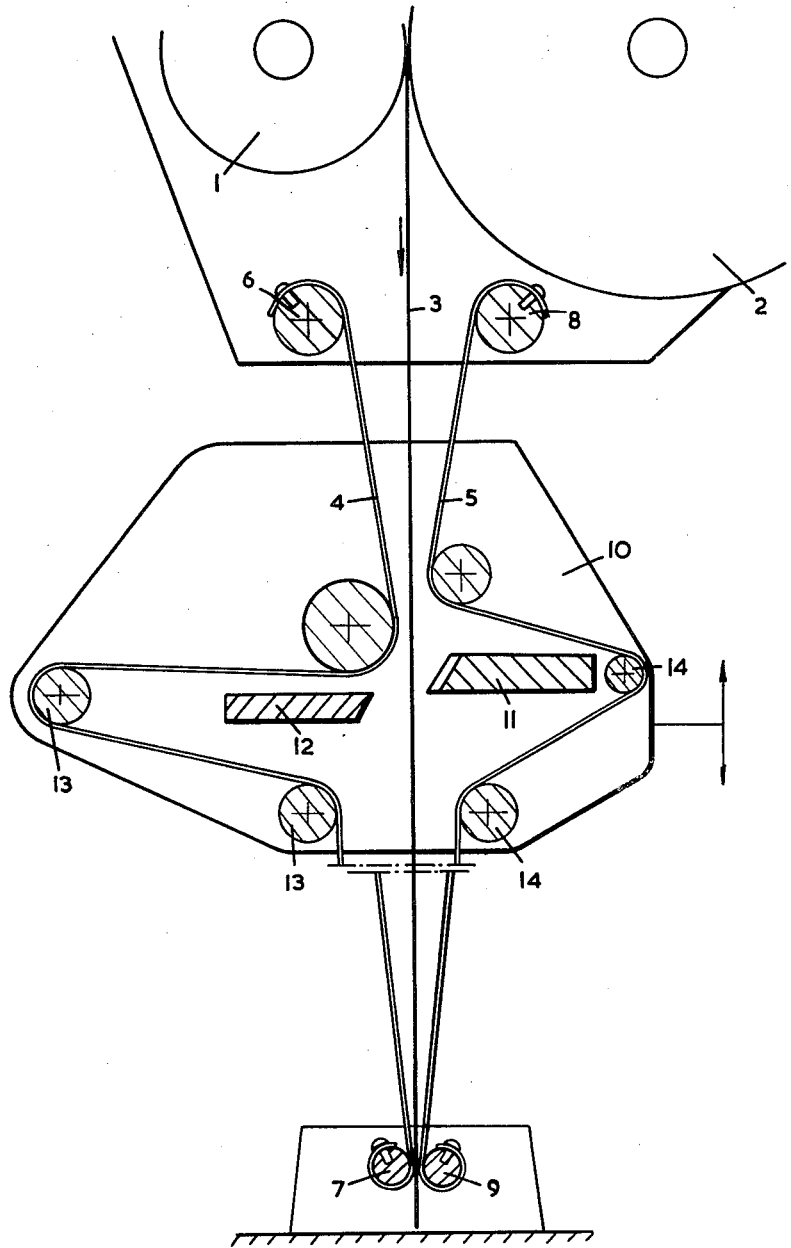

1

3,167,989
DEVICE FOR GUIDING A WEB OF MATERIAL FROM WHICH VARIABLE LENGTHS ARE TO BE SEVERED
Cornelis Sol, Westzaan, Netherlands, assignor to N.V. Machinefabriek "Verwachting," Wormer, Netherlands, a corporation of the Netherlands
Filed May 21, 1963, Ser. No. 281,956
Claims priority, application Netherlands, May 23, 1962, 278,766
2 Claims. (Cl. 83—449)

In machines for packaging boxes and like articles each in a pre-determined length severed from a web of material, such web of material, which is supplied by a pair of cooperating supply rollers, must be guided throughout the length supplied.

It is an object of the present invention to provide such a construction for the device for guiding the supplied portion of the web of material that this device need not be adjusted, irrespective of the position of the cutting blades in connection with the length to be severed from the supplied web of material.

To this effect the guiding device according to the invention comprises a plurality of pairs of guide belts or strings for guiding a web of material between each pair of belts, the belts of each pair having their ends secured to stationary holders, and each being guided round the adjacent blade carried by a vertically adjustable blade holder, by means of return rollers mounted on said blade holder.

In illustration of the invention, an embodiment of the guiding device will be described with reference to the accompanying drawing.

Referring to the drawing, which illustrates a diagrammatic sideview of the guiding device, the web of material 3, which is supplied by supply rollers 1 and 2, is during its downward movement guided between pair-wise cooperating guide belts 4 and 5. The ends of the guide belts 4 and 5 are secured to stationary holders 6, 7, 8 and 9.

A cutting device, which comprises a blade holder 10 adjustable vertically as indicated by the arrows on the drawing, said holder carrying a stationary blade 11 and a horizontally reciprocable blade 12, serves for cutting the web of material transversely to its direction of supply.

The blade holder 10 is equipped with two sets of return rollers 13 and 14, respectively serving for guiding the guiding belts 4 and 5 round the cooperating blades 12 and 11.

By virtue of this construction, it is possible, depend-

2 ent upon the height at which the blade holder 10 is adjusted, to cut a desired length from the web of material 3 advanced between the blades, which is at all times guided by the guiding belts 4 and 5 throughout its length, without it being necessary for the guiding belts 4 and 5 to be adjusted in any way when adjusting the height of the blade holder.

I claim:
1. Means for transversely severing a web of material comprising opposed supply rollers for advancing the web, a pair of oppositely arranged belts each having one end attached to a stationary holder at the delivery side of the supply rollers and on opposite sides of the web, and its opposite end attached to a stationary holder at a more advanced point in the travel of the web, a longitudinally adjustable blade holder between the points of attachment for the belts, a pair of cooperating blades on the blade holder and means for guiding the belts in spaced relation along the direction of travel of the web and in the rear of the cutting blades.

2. Means for transversely severing a web of material comprising opposed supply rollers for advancing the web, a pair of oppositely arranged belts each having one end attached to a stationary holder at the delivery side of the supply rollers and on opposite sides of the web, and its opposite end attached to a stationary holder at a more advanced point in the travel of the web, a longitudinally adjustable blade holder between the points of attachment for the belts, a pair of cooperating blades on the blade holder, a pair of closely spaced opposing rollers on the blade holder in advance of the blades, a roller on the blade holder in rear of each blade, and a pair of closely spaced opposing rollers on the blade holder beyond the blades, said belts being trained around the rollers in the said order.

References Cited by the Examiner
UNITED STATES PATENTS

| | | | |
|---|---|---|---|
| 1,907,742 | 5/33 | Coleman | 83—446 X |
| 2,320,652 | 6/43 | Preston | 83—310 X |
| 2,661,707 | 12/53 | Clement | 83—110 |
| 3,099,181 | 7/63 | Hergenhan | 83—440 X |

FOREIGN PATENTS 359,511   10/31   Great Britain.

ANDREW R. JUHASZ, *Primary Examiner.*
WILLIAM W. DYER, JR., *Examiner.*